Patented May 3, 1949

2,468,739

UNITED STATES PATENT OFFICE 2,468,739

CONDENSATION OF OLEFINIC COMPOUNDS WITH HYDROGEN SULFIDE

John L. Eaton, Trenton, and John B. Fenn, Riverview, Mich., assignors to Sharples Chemicals Inc., Philadelphia, Pa., a corporation of Delaware No Drawing. Application December 30, 1943, Serial No. 516,244

8 Claims. (Cl. 260—609)

The present invention pertains to the manufacture of mercaptans by condensation of hydrogen sulfide with olefinic compounds. It is an improvement in the process of the prior application of John F. Olin, Serial No. 459,025, now abandoned, as applied to the manufacture of products of that application, and it is a specific improvement of the process of the application of John F. Olin and John L. Eaton, Serial No. 472,946, filed January 20, 1943, which has issued as Patent No. 2,434,510, insofar as that application pertains to manufacture of aliphatic and cycloaliphatic mercaptans containing from 8 to 24 carbon atoms in the aliphatic or cyclo-aliphatic radical.

The invention may be practiced in condensation of hydrogen sulfide with various olefinic compounds, including the open chain olefins and cyclo-aliphatic olefins having from 8 to 24 carbon atoms. It was developed, however, in connection with attempts to improve the economic conditions involved in condensation of branched chain olefins with hydrogen sulfide to form tertiary alkyl mercaptans, and will accordingly be described, for purposes of illustration, as a process of making such mercaptans by such a process.

When an olefin containing a branched chain at the double bond is condensed with hydrogen sulfide, a tertiary alkyl mercaptan is formed by the condensation. Similarly, when an olefin containing a branched chain closely adjacent to the double bond is condensed with hydrogen sulfide, a tertiary alkyl mercaptan is formed by isomerization of at least a part of the olefin and condensation. Olefins capable of being condensed with hydrogen sulfide to form the tertiary mercaptans are referred to hereinafter as tertiary olefins, regardless of whether the tertiary mercaptan is formed by condensation of the hydrogen sulfide with an olefin having the branched chain at the double bond, or whether the tertiary configuration is attained by isomerization, as described above. A preferred class of tertiary olefins for use in practice of the invention consists in the branched chain olefins containing between 8 and 24 carbon atoms formed by polymerization of lower olefins. A readily available olefin which lends itself well to practice of the invention in formation of a valuable mercaptan is tri-isobutylene. Upon condensation with hydrogen sulfide, this olefin yields tertiary dodecyl mercaptan, as explained in the co-pending applications referred to above.

In the manufacture of mercaptans by catalytic reaction between hydrogen sulfide and an olefin, the desirable condensation reaction is reversible, as indicated by the following equation,

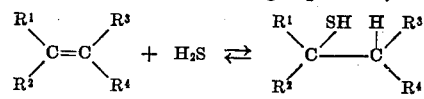

in which $R^1$, $R^2$, etc. represent the same or different alkyl, hydrogen or an aryl or heterocyclic radical. As a consequence of this reversibility, the degree of conversion attainable in a given time is limited by the concentration of reactants as well as the activity of the catalyst. Catalysts employed to promote this reaction also promote polymerization and depolymerization of the olefin under treatment. The conversion of a part of the olefin to be condensed with hydrogen sulfide into a different olefin decreases the yield for at least two reasons. In the first place, polymerization or depolymerization involves conversion of the olefin of the carbon content desired into an olefin which cannot be condensed with the hydrogen sulfide to produce the desired mercaptan. Secondly, the olefin resulting from polymerization or depolymerization of the olefin corresponding to the desired mercaptan is condensed with hydrogen sulfide to produce a considerable quantity of mercaptan of carbon content other than that desired. This results in loss of effective use of both olefinic material and hydrogen sulfide in practice of the process, and also causes a chemical equilibrium to be established at a point at which a smaller proportion of the desired mercaptan has been formed than would be the case if the polymerization and depolymerization reactions could be eliminated during condensation of the olefin with hydrogen sulfide. These difficulties are especially pronounced in condensation with hydrogen sulfide of olefins formed by polymerization of lower olefins.

A feature of the present invention consists in the fact that it involves practice of a condensation reaction of this type with the aid of a catalyst which is capable of promoting the desired condensation reaction while reducing the degree of polymerization or depolymerization, as compared to prior art catalysts, and in employing unusually low temperatures during the reaction and treating the reaction mixture with a quenching agent to destroy the effectiveness of the catalyst at a time when said reaction mixture is at a very low temperature. This destruction of the effectiveness of the catalyst may be achieved by quenching it with water or other inorganic or organic liquid, gas or solid capable of diluting the catalyst or combining with it chemically or physically to render it inactive.

The preferred catalysts used in practice of the present invention are boron fluoride, hydrogen fluoride, aluminum chloride and ferric chloride. As in the prior application of Olin and Eaton, Serial No. 472,946, we effect condensation of hydrogen sulfide with olefins in the practice of the present invention at temperatures much lower than those which have heretofore been successfully used in condensation of olefins with hydrogen sulfide.

The present invention rests upon the use of extremely low temperatures, and in quenching the catalyst while the resultant mixture containing the desired mercaptan is at a very low temperature.

Experimentation with the process of the abovementioned application of Olin and Eaton, Serial No. 472,946, has proved that results are attained in practice of the process of that application which are amazingly better from the standpoint of yield and conversion than results obtainable from condensation of comparable olefins with hydrogen sulfide under any other reaction conditions. In conducting such experimentation, however, we have obtained results which vary considerably in connection with operations in which the condensation has been conducted under conditions of temperature, catalyst, hydrogen sulfide concentration and olefin to be condensed which are so similar to each other that one would normally expect to obtain almost identical results. The results as to yields and conversions have been much less satisfactory in some such operations than in others.

After much experimentation, we finally conceived the process of the present application, and the discrepancies in the results heretofore obtained have been overcome by practice of this process.

In order to facilitate understanding of this invention, we will first describe the method of operation practiced under the best conditions for producing tertiary mercaptans containing from 8 to 24 carbon atoms from the corresponding olefins. A typical instance of practice of an addition reaction of this type is that involved when triisobutylene is condensed with hydrogen sulfide with the aid of boron fluoride or a mixture of boron fluoride and hydrogen fluoride as the catalyst. We have found that, in accomplishing this condensation, the reaction can be caused to proceed rapidly to the right even at temperatures below $-40°$ C., and there is a distinct advantage in use of such low temperatures, since the resultant mixture contains a larger ratio of the desired mercaptan to the reactant olefin and hydrogen sulfide in case of use of these extremely low temperatures than when higher temperatures are used. Temperatures even as low as $-70°$ C. can be used effectively to promote an equilibrium condition at which an extremely high ratio of the olefin has been converted into the desired mercaptan.

This reaction may be accomplished either in batch operation or continuously. Thus, the reactants and catalysts may be brought together in an autoclave or other reaction vessel maintained at the desired reaction temperature until substantial equilibrium is attained. After attainment of substantial equilibrium, involving a very high conversion, the effectiveness of the catalyst is destroyed by addition of a quenching agent capable of rendering it inactive. This addition of the quenching agent should occur at a time when the reaction mixture is at an extremely low temperature, preferably below $-40°$ C. The desired quenching operation can be attained by addition to the reaction mixture of various organic and inorganic liquids, gases or solids. Aqueous quenching agents are preferred, since they are both cheap and effective. Water serves as an excellent quenching agent, although when used without a freezing point depressant it is subject to the drawback that, when it is added in moderate amounts, it is cooled to below the freezing point by the reaction mixture, with the resultant formation of crystals of ice. If water is used as the quenching agent without incorporation therein of an electrolyte or other freezing point depressant in a continuous process, it is therefore desirable that heat be introduced into the portion of the equipment immediately beyond the zone of introduction of the water in order to avoid cloggage of the apparatus with ice crystals. An advantageous method of quenching with water consists in the application of steam to the reaction mixture. The advantages in introduction of steam, as compared to introduction of water in the liquid phase, are two-fold:

(a) Steam mixes more rapidly with the reaction mixture and thus effects the quenching function more promptly.

(b) The extraction of the latent heat of vaporization of the steam by the reaction mixture raises the temperature thereof to a point above $0°$ C., with the result that the problem of cloggage by ice is avoided.

From the discussion above of the use of steam as the quenching agent, it will be seen that it is immaterial if the temperature of the reaction mixture is raised rapidly to a point beyond the upper limit discussed above, so long as the temperature of the reaction mixture is maintained below the permissible upper limit until the quenching agent is added. The steam or other quenching agent acts to destroy the effectiveness of the catalyst with such rapidity that the desired conversion is attained, even though the temperature be raised to a point which would cause drastic reduction in conversions if the reaction mixture were allowed to maintain this same temperature a brief time before quenching.

While the invention has been discussed above in connection with use of the very best temperature conditions and the preferred catalyst of the invention, we wish it to be understood that the invention may be practiced by use of reaction temperatures and temperatures prior to quenching as high as $-20°$ C. and even as high as $0°$ C., in use of this or the other catalysts of the invention in condensation of tertiary olefins having between 8 and 24 carbon atoms with hydrogen sulfide. Thus, greatly improved results as compared to prior art operation may be attained by maintaining the tertiary olefin and hydrogen sulfide at any temperature below $0°$ C. in the practice of the invention with the aid of any of the catalysts discussed above, so long as the additional precaution is taken to destroy the effectiveness of the catalyst by treating the resultant mixture with a quenching agent, and so long as the temperature is below 0° C. at the time of treatment with the quenching agent.

In the treatment of secondary olefins having between 8 and 24 carbon atoms to form secondary mercaptans in the practice of the invention, somewhat higher temperatures are preferred both for the reaction and for the quenching than in the case of manufacture of tertiary mercaptans from tertiary olefins. Even in the case of manufacture of secondary mercaptans, however, temperatures below 0° C. provide greatly improved conversions if employed both for the reaction and at the time of treatment with the quenching agent, as compared to operation at higher temperatures.

The invention has been discussed above in terms of use of individual catalysts. Various combinations of these individual catalysts may, of course, be used. A combination which has provided better results than any individual catalyst is one consisting of a mixture of boron fluoride with hydrogen fluoride, the boron fluoride predominating in the catalyst mixture. The use of this combination of catalysts in a reaction of this character is described and claimed in our co-pending application Serial No. 516,245, filed December 30, 1943.

While the invention includes, as vitalizing features, the conduct of the desired reaction at a temperature below 0° C. and quenching at a time when the reaction mixture is at a temperature below 0° C., the reaction mixture may be raised to a temperature somewhat above 0° C., between the initial step of reaction and the ultimate quenching step without materially impairing results attainable as described above, provided the vital precautions of reaction and quenching at a temperature below 0° C. are maintained.

The invention has been described above in its preferred form as involving use of water, steam or aqueous electrolyte solutions as quenching agents. Instead of using an aqueous quenching agent such as water, however, the activity of the catalyst may be destroyed by treatment with various other organic and inorganic quenching agents such as ammonia, amines, urea or alkylated ureas, alcohols, ethers, bases, salts, etc.

Example I 1748 grams of tri-isobutylene and 789 grams of hydrogen sulfide were placed in a one gallon steel bomb and cooled to −65° C. 55 grams of boron fluoride were then introduced into the bomb, and this caused the temperature to rise to −30° C. The bomb was then again cooled to −65° C., and the contents were discharged through a 0.25 inch pipe into immediate confluence with a moderate flow of steam directed into this discharge pipe. The crude quenched product was later washed with sodium hydroxide solution and filtered. The filtrate consisted of 1985 grams of crude product which was almost water white, had a specific gravity of 0.861 at 20° C., and was found, upon analysis, to contain 97.6% of tertiary dodecyl mercaptan.

Example II

Hydrogen sulfide at a rate of 19 pounds per hour and tri-isobutylene, containing 0.15% of anhydrous hydrogen fluoride, at a rate of 43 pounds per hour were pumped concurrently through a reactor tube, cooled to a temperature of −61° C. by means of a solid carbon dioxide-alcohol bath, for a period of seven hours. At a point in the reactor tube, after which a sojourn time of about 3 minutes obtained, boron trifluoride was continuously introduced in an amount equivalent to about 1.6% by weight of the total reaction mixture. Immediately upon leaving the cooled portion of the reactor tube, live steam was intimately mixed with the effluent in such a manner as to drive off all the unreacted hydrogen sulfide and to leave the product at a temperature of about 40° C. By means of a decanting device the steam condensate was separated from the crude product which was in turn washed with dilute sodium hydroxide and filtered. There were thus obtained 335 pounds of a clear, light yellow material containing 83% of the desired dodecyl mercaptan.

Example III 1458 grams of hydrogen sulfide and 720 grams of tri-isobutylene were charged into a 1 gallon steel bomb immersed in a bath at a temperature of −14° C. Approximately 10 grams of boron trifluoride were introduced, whereupon the temperature rose to 0° C. Within about 10 minutes the temperature again fell to −14° C. and the contents of the bomb were discharged through a 0.25 inch pipe into confluence with a stream of steam sufficient to vaporize the unreacted hydrogen sulfide and bring the resulting mixture of oil and water to a temperature of about 40–50° C. The effluent mixture was collected and the product decanted from the steam condensate. It was found to have a specific gravity of 0.850 at 20° C. corresponding to about 87% tertiary dodecyl mercaptan.

Example IV

About 200 grams of a mixture containing 2 parts of hydrogen sulfide (by weight) to 1 of tri-isobutylene were placed in a glass flask immersed in a bath cooled to −60° C. with solid carbon dioxide. Approximately 50 grams of anhydrous ferric chloride were then dumped in and the mixture stirred vigorously for forty-five minutes to an hour. The contents of the flask were then poured into 2 liters of water and shaken thoroughly. The oil layer was decanted and found to contain about 50 percent tertiary dodecyl mercaptan.

Example V

Approximately 125 grams of tri-isobutylene were placed in a glass flask containing 50–75 grams of anhydrous aluminum chloride. The mixture was stirred thoroughly and cooled to −60° C. by immersion in a bath cooled with solid carbon dioxide. About 250 grams of liquid hydrogen sulfide were added and after about five minutes 15–20 grams more of $AlCl_3$ were introduced. The mixture was allowed to stand for about two hours with occasional stirring and then was poured into about 4½ liters of water and stirred vigorously. The product was decanted from the water layer and found to have a specific gravity of 0.850 at 20° C. corresponding to 85–90 per cent tertiary dodecyl mercaptan.

Example VI

Approximately 600 grams of a mixture containing 2 parts by weight of hydrogen sulfide to one part of tri-isobutylene were charged into a one gallon steel bomb at a temperature of −60° C. Boron trifluoride to the extent of about 20 grams was introduced and reaction took place as evidenced by a rapid pressure and temperature increase. The mixture was allowed to stand until the temperature again reached −60° C. A sample was then taken by discharging into water and showed that a conversion of 93-95% had occurred. Another portion of the charge was then allowed to flow slowly through a 1.5 inch glass tube about 12 inches in length which was about two-thirds full of 30 mesh dry urea. About two hours was required for the sample to pass through, during which time most of the hydrogen sulfide had vaporized off. By gentle warming the remaining gas was driven off. The specific gravity of 0.860 at 20° C. indicated that the catalyst had been successfully quenched and that upwards of 95% tertiary dodecyl mercaptan was present.

Example VII

About 200 grams of a mixture of hydrogen sulfide and tri-isobutylene were placed in a glass flask immersed in a bath cooled to −60° C. with Dry Ice. Boron trifluoride was then bubbled through the mixture until reaction occurred as indicated by sudden effervescence of hydrogen sulfide. About 50 grams of powdered lime were dumped into the flask and the mixture stirred for about 15 minutes. The excess hydrogen sulfide was then driven off by gentle warming and the product filtered. A specific gravity of 0.845 at 20° C. indicated the presence of about 82 per cent tertiary dodecyl mercaptan.

Example VIII 287 grams of a fraction of polymerized tri-isobutylene boiling between 173° C. and 185° C. at 3 mm. were dissolved in 131 grams of pentane and placed in a flask immersed in a bath at −60° C. About 250 grams of liquid hydrogen sulfide were then added together with approximately 2 cc. of anhydrous hydrogen fluoride. Boron trifluoride was then slowly bubbled through the mixture. Rapid reaction took place as was evidenced by the effervescence of hydrogen sulfide. About 400 cc. of a 50-50 methanol-water mixture cooled to −60° C. was then stirred into the reaction mixture. The excess hydrogen sulfide was driven off by gentle warming and the product decanted from the aqueous layer, then washed with dilute sodium hydroxide solution and water respectively. The pentane was distilled off leaving 330 grams of material which had a specific gravity of 0.840 at 25° C. and which analyzed 76% mercaptan as $C_{24}H_{49}SH$.

Example IX 192 grams of a fraction of polymerized pentene-2 boiling between 150° C. and 170° C. at 760 mm. were mixed with 250 grams of hydrogen sulfide in a glass flask and cooled to −65° C. by a Dry Ice-alcohol bath. Boron trifluoride was passed through the mixture for 5 minutes, vigorous reaction with ebullition of hydrogen sulfide occurring. A mixture of 250 cc. of water and 150 cc. of methanol, cooled to −65° C., was then stirred into the reaction mixture. The excess hydrogen sulfide was driven off and the product decanted and washed successively with dilute sodium hydroxide solution and water. 229 grams of material which analyzed 84.5% mercaptan as $C_{10}H_{21}SH$ were obtained.

Example X 106 grams of a fraction of polymerized pentene-2 boiling between 175° C. and 185° C. at 27 mm. were dissolved in 200 grams of hydrogen sulfide in a flask immersed in a bath cooled to −65° C. Boron trifluoride was passed through the mixture for three minutes. Vigorous reaction occurred, after which 500 cc. of a 50-50 methanol-water mixture cooled to −60° C. was stirred in. The excess hydrogen sulfide was driven off and the product decanted and washed with dilute caustic and water. 108 grams of material were obtained which was analyzed and found to contain 67.5 per cent mercaptan as $C_{20}H_{41}SH$.

Various modifications are possible within the scope of the invention, and we do not therefore wish to be limited except by the scope of the following claims.

We claim:

1. In the manufacture of mercaptans, the process comprising effecting contact in the fluid state at a temperature below 0° C. between a tertiary olefin having from 8 to 24 carbon atoms and a substantial proportion of hydrogen sulfide sufficient to condense with the olefinic compound to form a mercaptan as the principal resultant of the reaction, in the presence of as a catalyst at least one of the group consisting of boron fluoride, hydrogen fluoride, aluminum chloride and ferric chloride, the catalyst from the above-named group being the principal and essential catalytic constituent of the reaction mixture, and thereafter rendering the catalyst inactive by quenching the same with an aqueous quenching agent at a temperature below 0° C.

2. In the manufacture of mercaptans, the process comprising effecting contact in the fluid state at a temperature below 0° C. between a tertiary olefin having from 8 to 24 carbon atoms and a substantial proportion of hydrogen sulfide sufficient to condense with the olefinic compound to form a mercaptan as the principal resultant of the reaction, in the presence of as a catalyst at least one of the group consisting of boron fluoride, hydrogen fluoride, aluminum chloride and ferric chloride, the catalyst from the above-named group being the principal and essential catalytic constituent of the reaction mixture, and thereafter rendering the catalyst inactive by quenching the same with steam, said steam being initially introduced into said reaction mixture while said reaction mixture is at a temperature below 0° C., and continuing the introduction of steam into said reaction mixture until said reaction mixture reaches a temperature above 0° C.

3. In a process for the condensation, at a temperature below 0° C., of hydrogen sulfide with a tertiary olefin having from 8 to 24 carbon atoms, wherein boron fluoride is employed as the condensation catalyst, the step which comprises inactivating said boron fluoride, after said condensation has been effected, by mixing aqueous methanol with the reaction mixture while maintaining the temperature of the reaction mixture below 0° C.

4. In a process for the condensation, at a temperature below 0° C., of hydrogen sulfide with a tertiary olefin having from 8 to 24 carbon atoms, wherein at least one of the group consisting of boron trifluoride, hydrogen fluoride, aluminum chloride and ferric chloride is employed as the condensation catalyst, the step which comprises inactivating said catalyst in the reaction mixture after said condensation has been effected by intimately contacting said reaction mixture with a substance for inactivating said catalyst in said reaction mixture, while maintaining the temperature of said reaction mixture below 0° C. during said inactivation of said catalyst.

5. The process of claim 4 wherein the catalyst employed in the condensation and subsequently inactivated is boron trifluoride.

6. The process of claim 4 wherein the catalyst employed in the condensation and subsequently inactivated is a mixture of boron trifluoride and hydrogen fluoride.

7. In a process for condensing tri-isobutylene with hydrogen sulfide at a temperature below 0° C. by means of a catalyst comprising boron trifluoride, the improvement which comprises destroying at a temperature below 0° C. the effectiveness of said catalyst in the reaction mass, after the desired condensation has been effected, by intimately contacting said reaction mass with a substance for destroying the effectiveness of said catalyst in said reaction mass.

8. The process of claim 4 in which the tertiary olefins having from 8 to 24 carbon atoms are polymers of lower olefins.

JOHN L. EATON.
JOHN B. FENN.

REFERENCES CITED

The following references are of record in the file of this patent:

UNITED STATES PATENTS

| Number | Name | Date |
| --- | --- | --- |
| 1,836,170 | Johansen | Dec. 15, 1931 |
| 1,836,183 | Nisson | Dec. 15, 1931 |
| 2,051,806 | Allen | Aug. 25, 1936 |
| 2,052,268 | Williams | Aug. 25, 1936 |
| 2,101,096 | Reuter | Dec. 7, 1937 |
| 2,173,482 | Keuneke | Sept. 19, 1939 |
| 2,352,435 | Hoeffelman | June 27, 1944 |
| 2,366,453 | Meadow | Jan. 2, 1945 |

OTHER REFERENCES

"Systematic Organic Chemistry," 2d ed., Constable & Co., London, 1931, pages 87, 88, and 90.

Thomas, "Anhydrous Aluminum Chloride in Organic Chemistry," Reinhold, New York, 1941, pages 867, 868.

Mayo, "Chemical Reviews," vol. 27, 1942, pages 388–394.